US012443250B2

(12) United States Patent
Moore

(10) Patent No.: US 12,443,250 B2
(45) Date of Patent: Oct. 14, 2025

(54) ELECTRONIC DEVICE HAVING KEYING MECHANISMS FOR A DRIVE CARRIER AND A DRIVE CAGE

(71) Applicant: HEWLETT PACKARD ENTERPRISE DEVELOPMENT LP, Spring, TX (US)

(72) Inventor: Earl W. Moore, Houston, TX (US)

(73) Assignee: Hewlett Packard Enterprise Development LP, Spring, TX (US)

(*) Notice: Subject to any disclaimer, the term of this patent is extended or adjusted under 35 U.S.C. 154(b) by 265 days.

(21) Appl. No.: 18/161,237

(22) Filed: Jan. 30, 2023

(65) Prior Publication Data

US 2024/0256008 A1 Aug. 1, 2024

(51) Int. Cl.
G06F 1/18 (2006.01)
G11B 33/12 (2006.01)
H05K 7/14 (2006.01)

(52) U.S. Cl.
CPC ............ G06F 1/187 (2013.01); G11B 33/126 (2013.01); G11B 33/128 (2013.01); H05K 7/1489 (2013.01)

(58) Field of Classification Search
None
See application file for complete search history.

(56) References Cited

U.S. PATENT DOCUMENTS

| | | | |
|---|---|---|---|
| 6,272,010 B1 | 8/2001 | Schmitt | |
| 6,282,087 B1* | 8/2001 | Gibbons | G06F 1/187 361/727 |
| 6,906,914 B2* | 6/2005 | Stamos | G06F 1/183 361/679.31 |
| 7,190,575 B1 | 3/2007 | Baik et al. | |
| 8,149,586 B2 | 4/2012 | Curnalia et al. | |
| 10,264,701 B1 | 4/2019 | Norton | |
| 10,653,029 B2 | 5/2020 | Schulze et al. | |
| 10,820,415 B1 | 10/2020 | Stenfort | |
| 2005/0237707 A1* | 10/2005 | Connelly, Jr. | G11B 33/08 |
| 2006/0067042 A1* | 3/2006 | Salinas | G11B 33/124 361/679.37 |
| 2014/0240915 A1* | 8/2014 | Phelan | G06F 1/182 361/679.31 |
| 2017/0010641 A1* | 1/2017 | Moore | G11B 33/02 |
| 2020/0229317 A1 | 7/2020 | Martinez Araiza et al. | |

* cited by examiner

*Primary Examiner* — Allen L Parker
*Assistant Examiner* — Christopher L Augustin
(74) *Attorney, Agent, or Firm* — Hewlett Packard Enterprise Patent Department

(57) ABSTRACT

Electronic device includes a drive carrier, a drive cage, and a backplane circuit board. The drive carrier includes a front structure, a first side structure having a keying protrusion, and a second side structure, which in conjunction receives a media drive such that a rear face of the front structure abuts a front face of the drive and the keying protrusion extends beyond a rear face of the drive. The drive cage includes a drive bay and a keying flange inside the drive bay. When the drive carrier is arranged in the drive bay in a first orientation, the keying protrusion aligns with the keying flange and prevents the drive to couple with the backplane circuit board. When the drive carrier is arranged in the drive bay in a second orientation, the keying protrusion aligns away from the keying flange and allows the drive to couple with the backplane circuit board.

19 Claims, 9 Drawing Sheets

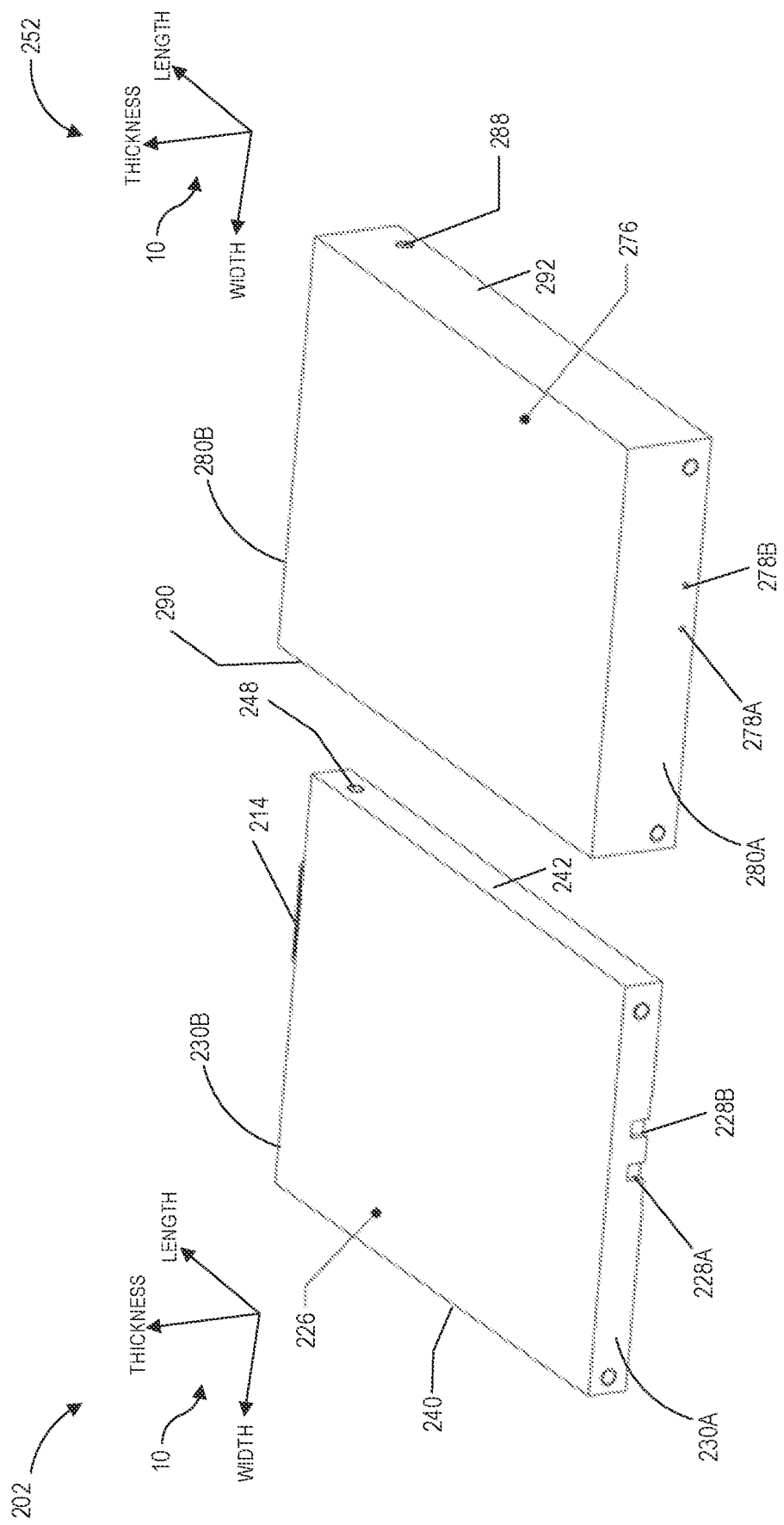

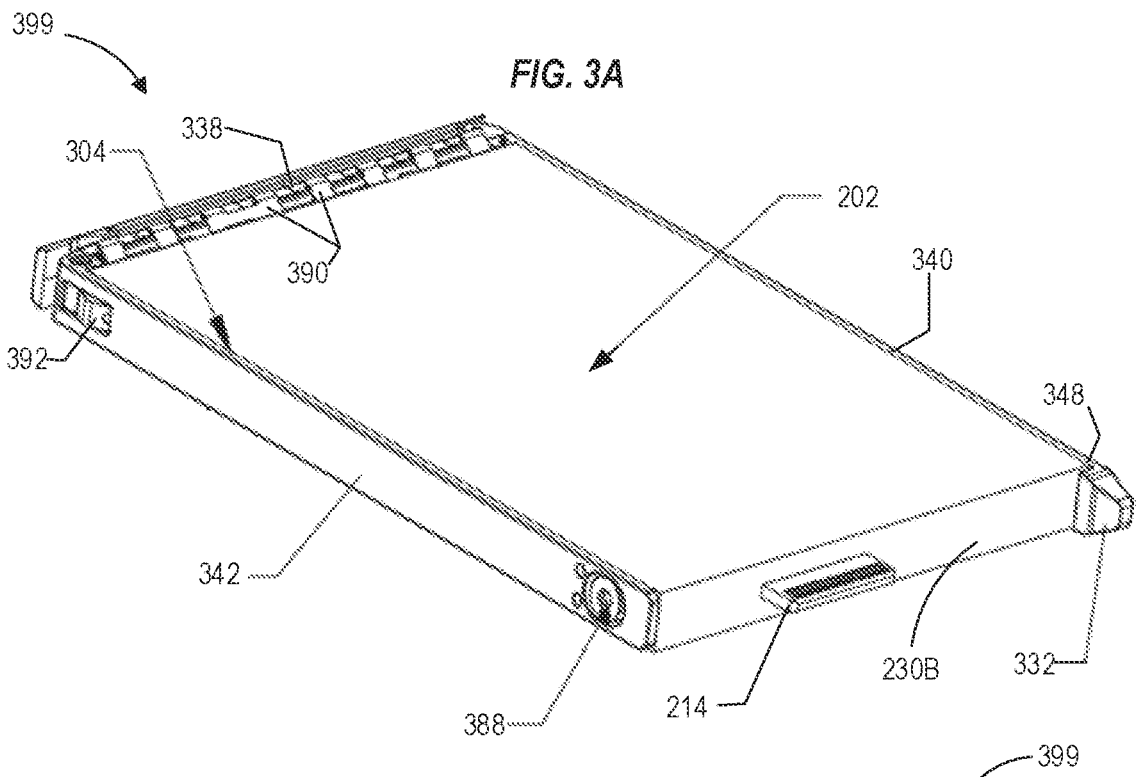
FIG. 3A
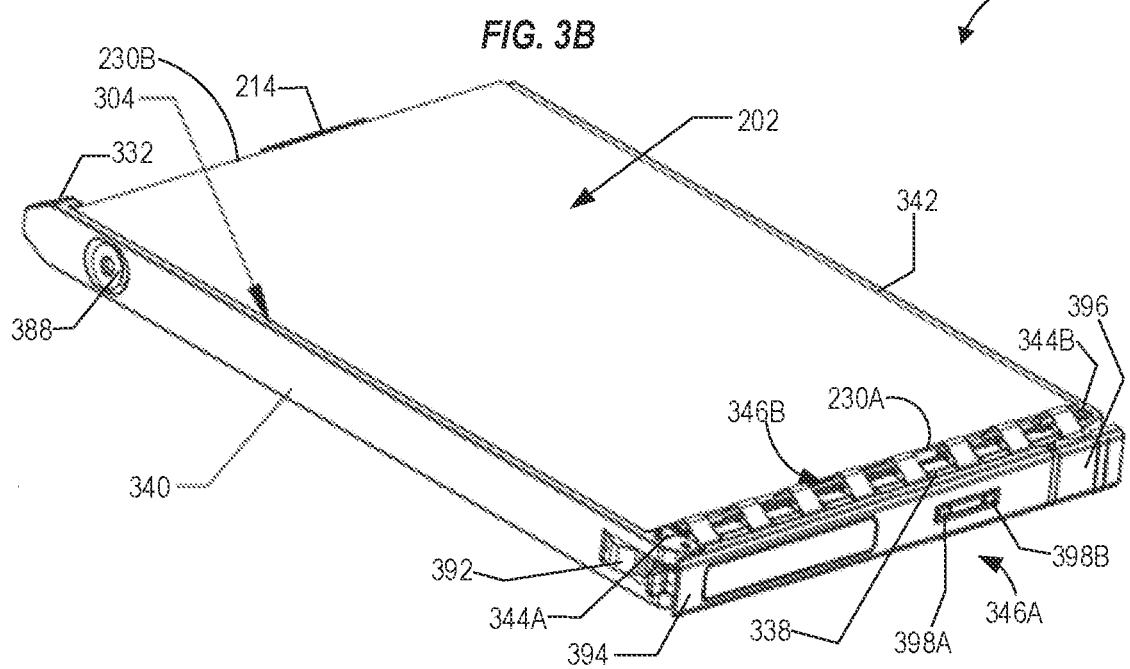
FIG. 3B
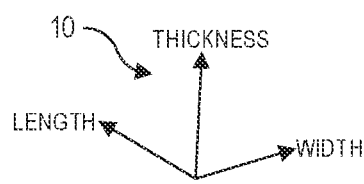

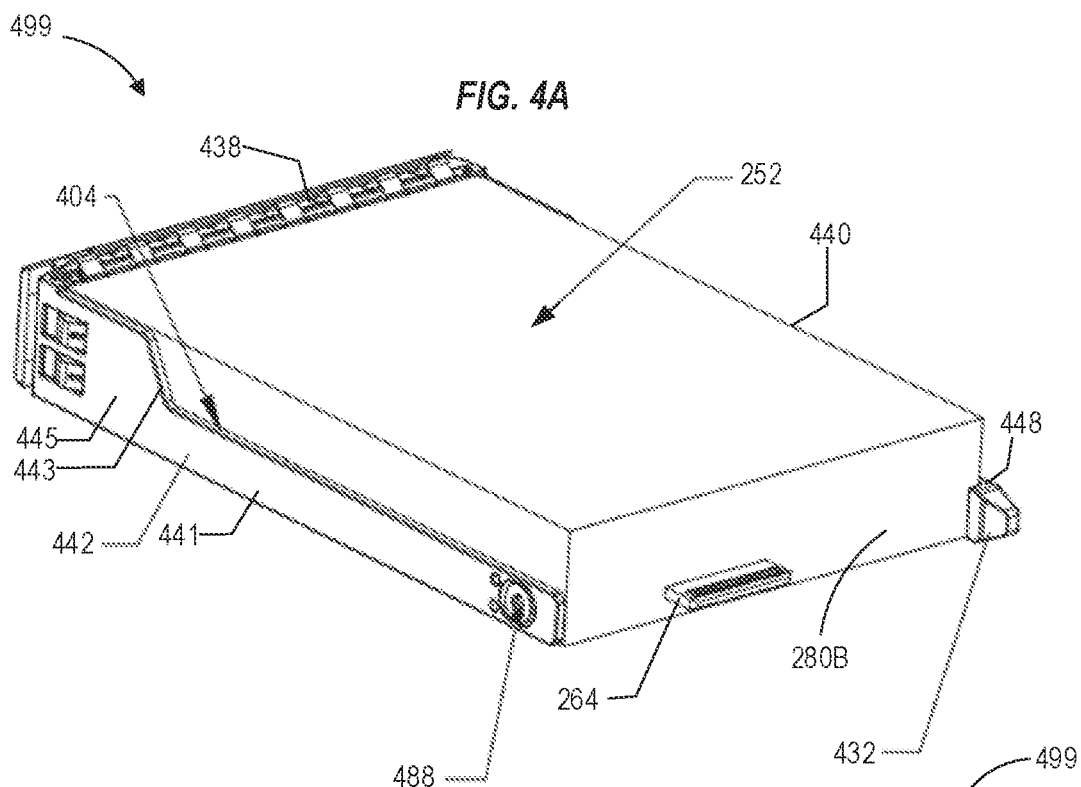
FIG. 4A
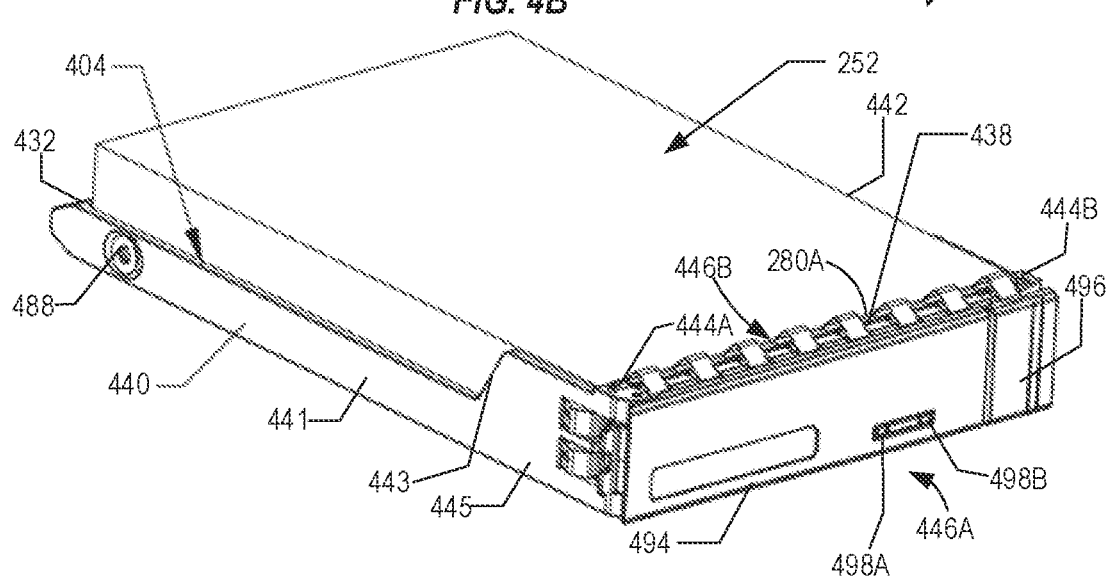
FIG. 4B
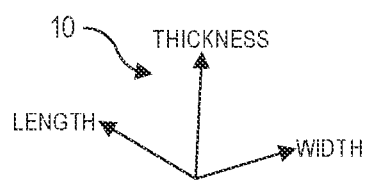

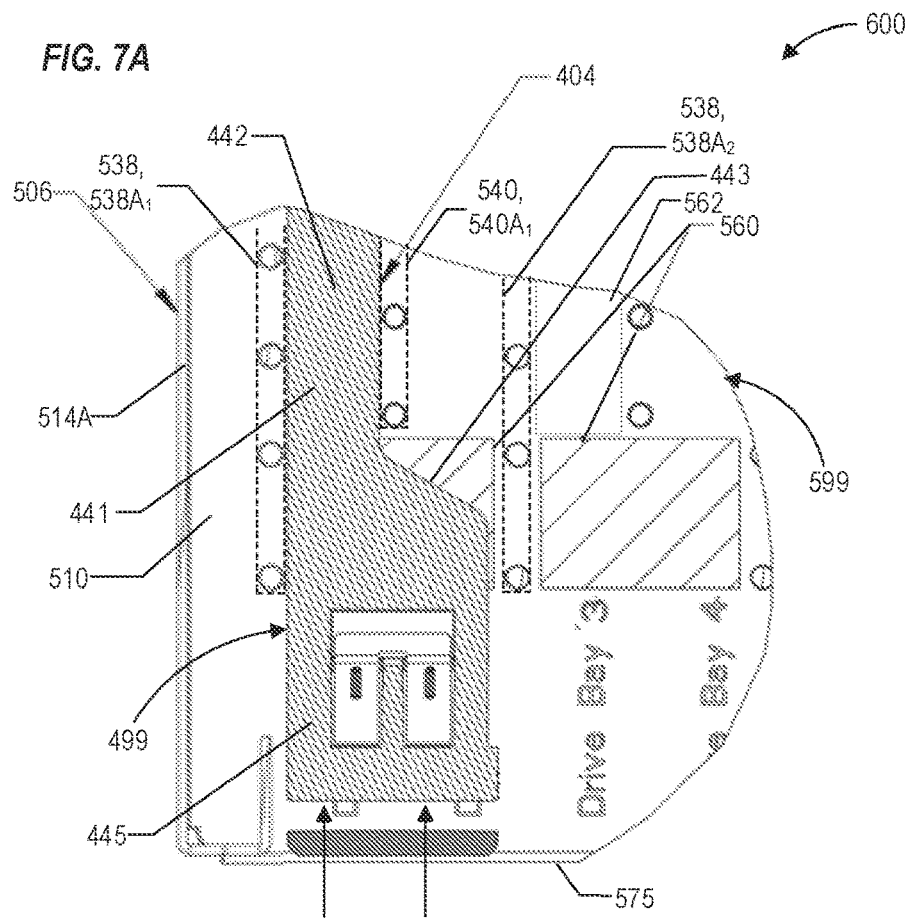
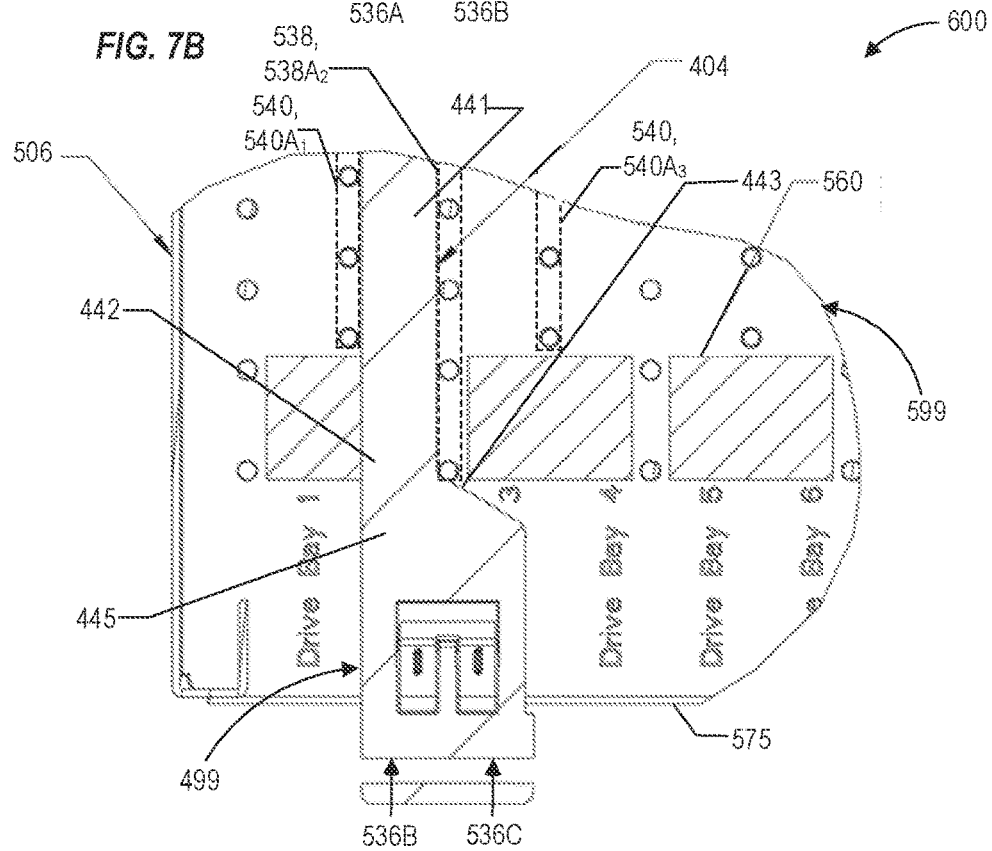

ELECTRONIC DEVICE HAVING KEYING MECHANISMS FOR A DRIVE CARRIER AND A DRIVE CAGE

BACKGROUND

A computing device may include one or more media drives such as, solid state drives ("SSDs"), hard disk drives ("HDDs"), CD ROM drives, or DVD drives to store data. One or more receiving locations can be included in the chassis of the computing device for receiving those drives, such as one or more bays in a drive cage of the chassis. The media drives can either be directly mounted within those receiving locations, or may be first received in a carrier, which is itself receivable in the receiving location. A drive carrier may be used, for example, in a computing device (e.g., a server, a high-performance-compute device, a data storage appliance, a converged or hyper converged system, or other computing devices) to facilitate installation and uninstallation (e.g., hot-swapping) of the media drive to the computing device. In this manner, the drive carrier may be used to configure the media drive, such as an SSD, as a field replaceable unit (FRU) to make the media drive hot-pluggable.

When a drive carrier with a media drive (i.e., with the media drive received in the drive carrier) is arranged in (received in) a drive cage of a computing device in a proper orientation, the drive carrier may couple a connector of the media drive to a corresponding connector of a backplane circuit board of the computing device. However, when the drive carrier is arranged in the drive cage in an improper orientation, the connectors of the media drive and the backplane may not be aligned and thus they do not couple. In addition, the connector of the media drive may bump into the backplane circuit board or the connector of the backplane circuit board may bump into the media drive, which may cause damage to the backplane circuit board and/or the media drive. Therefore, a computing device may include one or more keying features to prevent the drive carrier from being fully installed in the drive cage when the drive carrier is arranged in the drive cage in an improper orientation.

BRIEF DESCRIPTION OF THE DRAWINGS

Various examples will be described below with reference to the following figures.

FIG. 2A illustrates a perspective view of a media drive having a 1 T thickness.

FIG. 2B illustrates a perspective view of a media drive having a 2 T thickness.

FIG. 3A illustrates a perspective rear view of a drive carrier assembly having a drive carrier and the media drive of FIG. 2A according to an example of the present disclosure.

FIG. 3B illustrates a perspective front view of the drive carrier assembly of FIG. 3A according to an example of the present disclosure.

FIG. 4A illustrates a perspective rear view of a drive carrier assembly having a drive carrier and the media drive of FIG. 2B according to an example of the present disclosure.

FIG. 4B illustrates a perspective front view of the drive carrier assembly of FIG. 4A according to an example of the present disclosure.

FIG. 7A illustrates a cross-sectional top view of another portion of an electronic device having a drive carrier assembly of FIGS. 4A-4B arranged along a first drive bay of the drive cage assembly of FIG. 5 according to an example of the present disclosure.

FIG. 7B illustrates a cross-sectional top view of another portion of an electronic device having the drive carrier assembly of FIGS. 4A-4B arranged along a second drive bay of the drive cage assembly of FIG. 5 according to an example of the present disclosure.

DETAILED DESCRIPTION

Figure 1:
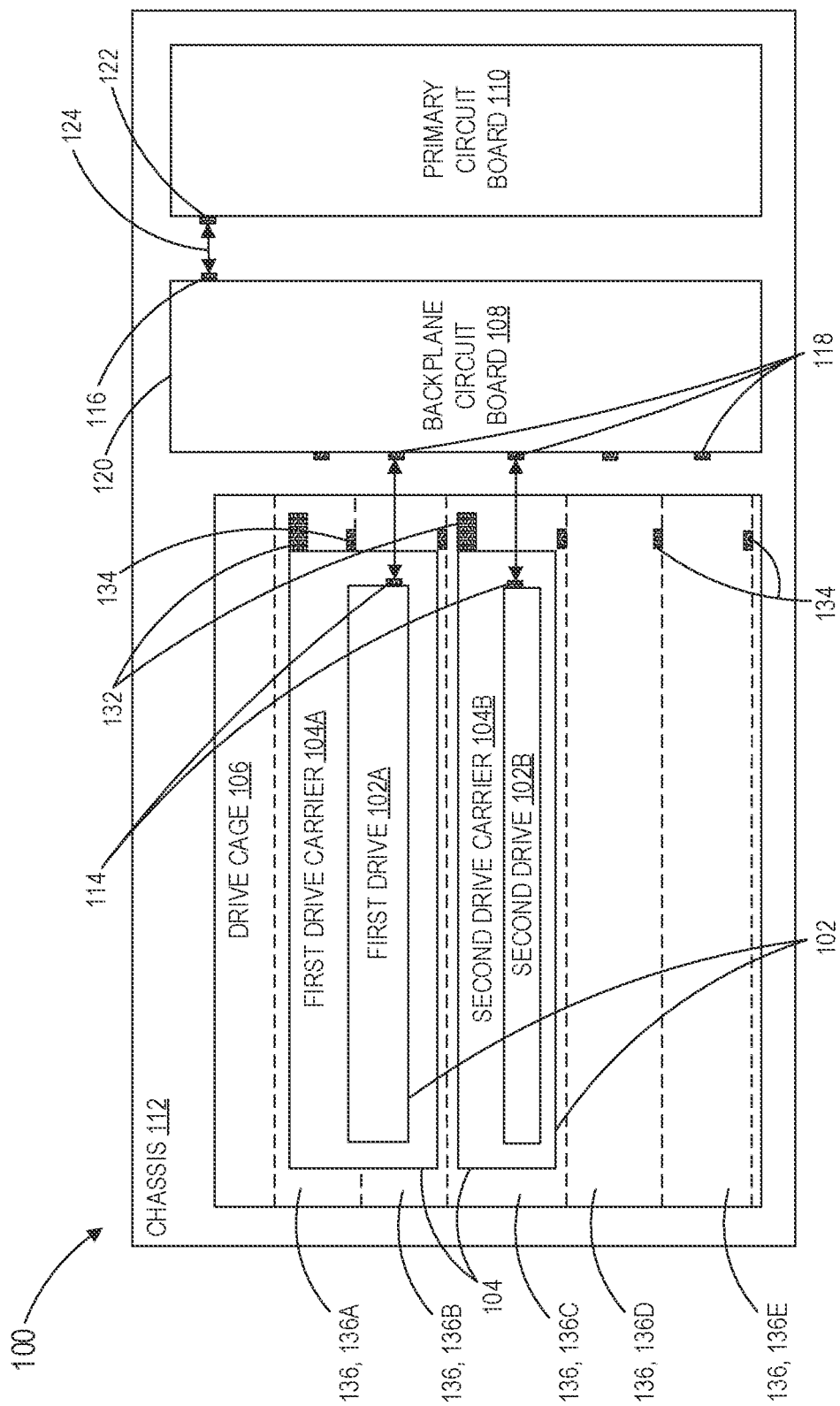
FIG. 1 illustrates a block diagram of an electronic device according to an example of the present disclosure.

The following detailed description refers to the accompanying drawings. For purposes of explanation, certain examples are described with reference to the components illustrated in FIGS. 1-9. The functionality of the illustrated components may overlap, however, and may be present in a fewer or greater number of elements and components. Moreover, the disclosed examples may be implemented in various environments and are not limited to the illustrated examples. Wherever possible, the same reference numbers are used in the drawings and the following description to refer to the same or similar parts. It is to be expressly understood, however, that the drawings are for the purpose of illustration and description only. While several examples are described in this document, modifications, adaptations, and other implementations are possible. Accordingly, the following detailed description does not limit the disclosed examples. Instead, the proper scope of the disclosed examples may be defined by the appended claims.

Drive carriers are used to configure media drives, such as SSDs, as FRUs, allowing the drives to be hot swapped into an electronic device (e.g., a computing device). Drive carriers are therefore defined by the physical form of the SSD, or drive, which they are configured to carry and are standardized by an industry form factor (e.g., an SSD form factor). An Enterprise & Data Center Standard Form Factor (EDSFF), for example, is designed for use in data centers in servers with storage devices such as SSDs. As a form factor, it defines specifications such as the dimensions and electrical interfaces storage devices should have, to ensure data center operators, server manufacturers, and SSD manufacturers, can make products that work with products from multiple manufacturers. As used herein, an EDSFF drive therefore refers to a type of a media drive that has a form factor specified in one of the standards in the EDSFF family of standards, including, but not limited to, a form factor specified in SFF-TA-1006, SFF-TA-1007, or SFF-TA-1008, and an EDSFF drive carrier is a drive carrier configured to carry and support an EDSFF drive.

Due to the small size of emerging EDSFF technologies, drive carriers designed to support EDSFF drives (EDSFF drive carriers) are significantly smaller than those designed for previous drive technologies. For example, the emergent EDSFF standards specify form factors such as the E1.S form factor which has drives that are as little as 31.5 mm wide and 5.0 mm thick, and the E3.S form factor which comprises drives that are as little 76.0 mm wide and 7.5 mm thick. In addition, the desire to include more of these drives within a given space in a computing system dictates that drive carriers be as small as possible. In particular, one dimension that has become very small in some drive carriers is the thickness dimension of the side structures of the carrier that extend along the lateral sides of the drive. For example, in some drive EDSFF drive carriers, the lateral rails of the drive carrier may be very thin, such as 1.45 mm (referring here to the depth of the side structures in the width dimension of the overall carrier).

Given the larger size of previous drives, in the past, it was possible to include keying features in the drive carrier within the volume of side structures of the drive carrier, such as keying slots cut into an outward facing surface of one (or both) of the side structures. The keying slot would receive a corresponding flange extending from a side wall of the drive cage as the drive carrier is inserted into the drive cage if the drive carrier was properly oriented. However, when the drive carrier is oriented improperly and inserted into a drive cage, the corresponding flange may contact an opposite side wall that does not include the keying slot (or that does include a keying slot but one that is positioned so as not to align the flange when improperly inserted or that has a different shape than the flange), and thereby prevent the drive cage from fully installing into the drive cage. As the size of the drive carrier gets smaller, however, particularly as the side structures get thinner (along the width dimension), an amount of space within the volume of the drive carrier's side structures may be insufficient to include keying features that can prevent improper installation of the drive carrier into the drive cage.

In addition, mounting holes (or screw holes) that are formed in side structures of a drive carrier, to allow assembly of the drive carrier to the drive, may limit the amount of available space to include a keying slot within the volume of side structures, when such mounting holes are formed in EDSFF drive carriers. For example, in prior drives the side structures may have sufficient height (along the thickness dimension of the drive carrier to allow the keying slot to be positioned above or below a mounting hole, but in drive carriers with relatively short side structures (such as some EDSFF drive carriers), there may not be sufficient space above or below the mounting holes to position a keying slot. In particular, for EDSFF drive carriers, it may be necessary to increase the strength of side structures around the mounting holes to prevent hoop stress that is generated from installing assembly screws. But if a keying slot were formed in the narrow spaces above or below the mounting holes, these regions would be weakened, which could cause structural failure. Further, the width and height of side structures for EDSFF drive carriers need to be significantly reduced with respect to the side structures for previous drive carriers, resulting in very little space for the flange to extend from the side wall of the drive cage into the keying slot.

In addition to the challenges noted above with respect to providing keying features for small drive carriers, EDSFF drive carriers may also provide additional challenges related to keying because they can come in multiple sizes that may need to be accommodated within a same drive cage. As the EDSFF drives are offered in two different thickness, two separate drive carriers having 1 T thickness and 2 T thickness (e.g., a 1 T drive carrier and a 2 T drive carrier) are needed to receive and carry such 1 T thickness drives and 2 T thickness drives. This may present challenges, however, when a single drive cage of a computing device receives both 1 T drive carrier and 2 T drive carrier, but the number of drive bays in the drive cage that each drive carrier occupies may be different. For example, the 1 T drive carrier may occupy one drive bay in the drive cage, while the 2 T drive carrier may occupy two drive bays. Because the 2 T drive carrier occupies two bays, it may be desired in some cases to restrict which bays can receive a 2 T drive carrier, for example to prevent sub-optimal arrangements. For example, with the 2 T drive carrier occupying two drive bays, there may be possibility that user may install the 2 T drive carrier such that one or more adjacent drive bays are not able to be filled with another the 2 T drive carrier. Additionally, it may be difficult to include label to instruct the user on how to optimize the 2 T drive carrier installation in the drive cage because of space constraint at the front of the drive cage.

A technical solution to the aforementioned problems includes implementing a keying protrusion into one of the side structures of a drive carrier, which extends beyond a rear face of a media drive, rather than a keying slot contained within a volume of the drive carrier. In particular, a keying flange, which extends from (e.g., is bent up from) a drive cage wall in each drive bay of the drive cage, may engage with the keying protrusion when the drive carrier is installed improperly, thereby preventing the media drive from being coupled to an electronic device. Hence, such keying features may prevent potential damage to a backplane circuit board and the media drive itself. However, when the drive carrier is properly installed in the drive cage, the keying protrusion doesn't make contact with the keying flange in the drive cage, thereby permitting the media drive to be coupled to the electronic device. Further, when the drive carrier is fully installed into the drive cage, the keying protrusion may be sufficiently far enough away from the backplane circuit board, so that there is no incidental contact between the keying protrusion and the backplane circuit board. In addition, component keep outs may be added to portions of the backplane circuit board directly behind the keying protrusion so that electrical components couldn't be added to the backplane circuit board that would interfere with the keying protrusion.

Since the keying protrusion extends beyond a rear face of a drive, the keying protrusion may not occupy space within the side structure. Thus, the keying protrusion may easily engage with the keying flange of the drive cage, when the drive carrier is improperly oriented and arranged in the drive cage. Further, since the keying protrusion is formed at the free end of one of the side structure of the drive carrier, the keying protrusion may not result in increasing the hoop stress of the side structure around the mounting holes.

Further, to ensure installation of the 2 T hard drive carrier into predetermined approved bays (e.g., odd numbered drive bays in some examples) and to maximize storage density of the drive cage, guide members e.g., a first guide member and a second guide member are designed into the drive cage to form the 2 T drive carrier keying zones, which may prevent installing of 2 T drive carrier into disapproved bays (e.g., even numbered drive bays in some examples). In particular, in some examples, the first and second guide members are disposed alternating along a width of the first and second walls of the drive cage. In some examples, the guide members comprise protrusions from bottom and/or top walls of the drive cage arranged such that an adjacent pair of a first guide member and a second guide member defines a space therebetween (e.g., a shallow slot or channel) that extends along a length dimension of the carriers and into which a side structure of the carriers may be slidingly received as the carriers are inserted in the drive cage. The guide members may be sheet metal flanges or embosses formed in the drive cage that engage the side structures of the drive carrier to guide the drive carrier during installation and prevent excessive movement during normal operation and during a shock/vibration event. Further, the first guide member in the drive cage is a full length guide member, which starts close to a front face of the drive cage and extends the length of the drive carrier. The second guide is a reduced length guide member which starts further back from the front face of the drive cage compared to the full length guide and extends the length of the drive carrier. The full length and reduced length guide members then alternate over the full width of the drive cage, in some examples. This pattern may create a 2 T drive carrier keying zone at the front of the drive cage, equaling the width of the 2 T drive carrier at the front portion of the assembly. In particular, the side structures of the 2 T drive carrier are geometrically identical to the 1 T drive carrier side structures through a first side portion of the length of the 2 T drive carrier. However, the second side portion of the 2 T drive carrier side structures diverges from the 1 T drive carrier in the front portion of the 2 T drive carrier, where more material is added to the top of the side structure to provide support to a front structure of the 2 T drive carrier. Accordingly, when the 2 T drive carrier is installed in an approved drive bay (e.g., an odd numbered drive bay in some examples), the 2 T drive carrier may be installed without issue as the extra material on the front portion of the side structure resides in the 2 T drive carrier keying zone. However, when the 2 T drive carrier is installed in a disapproved drive bay (e.g., an even numbered drive bay in some examples), the diverging section of the second side portion may engage with the front side of the full length guide member in the drive cage, thereby preventing installation of the 2 T drive carrier into the drive cage. As already noted, in some examples, the approved and disapproved bays for 2 T drives may be odd and even numbered bays, but in other examples other arrangements may be used. In particular, the first and second guide members may be used to enforce any desired arrangement of 2 T-approved and 2 T-disapproved bays.

Since the drive cage is designed with the guide members having full length and reduced length, and such guide members are disposed alternatively along the width of the drive cage in some examples, the storage density of the drive cage may be maximized by allowing the 2 T drive carrier to be installed only in the odd numbered drive bay and not in the even numbered drive bay.

Referring to the Figures, FIG. 1 depicts a block diagram of an electronic device 100. The electronic device 100 may be a computer (e.g., a server, a high-performance-compute device, a data storage appliance, a converged or hyper converged system, or other computing devices). In the example of FIG. 1, the electronic device 100 is the data storage appliance. In one or more examples, the electronic device 100 includes a media drive 102, a drive carrier 104, a drive cage 106, a backplane circuit board 108, a primary circuit board 110, and a chassis 112. It should be understood, however, that FIG. 1 is not intended to illustrate specific shapes, dimensions, or other structural details accurately or to scale, and that implementations of the electronic device 100 may have different numbers and arrangements of the illustrated components and may also include other parts that are not illustrated.

In some examples, the media drive 102 is an enterprise and datacenter standard form factor (EDSFF) drive, which may be used to store data. In such examples, the EDSFF drive may have a volume, e.g., a width of about 76 mm, a thickness in a range from about 7.5 mm to 16.8 mm, and a length of about 112.75 mm. In particular, the media drive 102 may be an E3.S EDSFF drive. In some examples, the media drive 102 having the thickness of about 7.5 mm may be referred to as an E3.S EDSFF 1 T drive and the media drive 102 having the thickness of about 16.8 mm may be referred to as an E3.S EDSFF 2 T drive. In some examples, the electronic device 100 includes two drives, e.g., a first media drive 102A and a second media drive 102B, where the first media drive 102A may be the E3.S EDSFF 2 T drive and the second media drive 102B may be the E3.S EDSFF 1 T drive. In some examples, the media drive 102 may include a first connector 114 (e.g., an edge plug), which may be coupled to the backplane circuit board 108, when the media drive 102 is installed into a drive bay 136 of the drive cage 106 by the drive carrier 104. Furthermore, it should be understood that the disclosed electronic device 100 may be used to carry various types and configurations of media drives, having different shapes, dimensions, and features, and is not intended to be restricted to a particular drive technology The drive carrier 104 is used to receive and carry the media drive 102 and releasably couple (e.g., install) the media drive 102 to the backplane circuit board 108 of the electronic device 100. In some examples, the drive carrier 104 is an EDSFF drive carrier sized and shaped to be able to receive and carry the EDSFF media drive 102. For example, the drive carrier 104 may include side structures (not illustrated) that extend in parallel to one another and define an open space therebetween into which the media drive 102 may be received, with the side structures extending lengthwise along, and being adjacent to (e.g., in contact with), the lateral sides of the media drive 102 in a state of the media drive 102 being received in the drive carrier 104. In one or more examples, the drive carrier 104 may include structures (not shown in FIG. 1) to attach the media drive 102 to the drive carrier 104 when the media drive 102 is received therein (explained in greater details in the example of FIGS. 3A-3B and 4A-4B). The state of the media drive 102 being received in and attached to the drive carrier 104 may be referred to as the media drive 102 being mounted to the drive carrier or as the drive carrier 104 carrying the media drive. In addition, the drive carrier 104 includes a keying protrusion 132 configured to prevent improper arrangement of the drive carrier 104 in the drive cage 106 (explained in greater details in the example of FIGS. 6A-6B). In the illustrated example, the electronic device 100 includes two drive carriers, e.g., a first drive carrier 104A and a second drive carrier 104B. In such examples, the first drive carrier 104A is configured to receive and carry the first media drive 102A and the second drive carrier 104B is configured to receive and carry the second media drive 102B. In some examples, the first drive carrier 104A may have a 2 T thickness to receive and carry the E3.S EDSFF 2 T drive and the second drive carrier 104B may have a 1 T thickness to receive and carry the E3.S EDSFF 1 T drive. The drive carrier 104 is discussed in greater details below in the example of FIGS. 3A-3B and 4A-4B.

The drive cage 106 may function as a drive enclosure which is designed to cover and protect the drive carrier 104 and the media drive 102. For example, the drive cage 106 may include the drive bay 136 to receive the drive carrier 104 and allow the media drive 102 to releasably couple to the backplane circuit board 108. In the illustrated example, the drive cage 106 has five drive bays 136A, 136B, 136C, 136D, 136E. In some examples, the drive carrier 104 carrying the 1 T thickness drive may occupy one drive bay, and the drive carrier 104 carrying the 2 T thickness drive may occupy two drive bays. The drive cage 106 may further include a keying flange 134 inside the drive bay 136. The keying flange 134 may be configured to prevent improper arrangement of the drive carrier 104 in the drive cage 106 (explained in greater details in the example of FIGS. 6A-6B). The drive cage 106 is discussed in greater details below in the example of FIG. 5.

In some examples, the backplane circuit board 108 may be a secondary circuit board of the electronic device 100. The backplane circuit board 108 may include a backplane connector 116 (e.g., a golden finger plug) and a second connector 118 (e.g., an edge socket), which are electrically connected to each other via traces (not shown) formed in a substrate 120. In some examples, the primary circuit board 110 may be a motherboard of the electronic device 100. The primary circuit board 110 may include a primary connector (e.g., a primary socket) to enable an electrical connection with the backplane circuit board 108.

The chassis 112 is used to house the primary circuit board 110, the backplane circuit board 108, and the drive cage 106 within an internal volume (not labeled) of the chassis 112. For example, the primary circuit board 110 may be coupled to a base (not shown) of the chassis 112. Further, the backplane circuit board 108 may be coupled to a rear end of the drive cage 106 to form a drive cage assembly, and such drive cage assembly of the drive cage 106 and the backplane circuit board 108 may be coupled to the base of the chassis 112. In such examples, the backplane connector 116 of the backplane circuit board 108 may be inserted into the primary connector 122 of the primary circuit board 110 to allow an electrical connection 124 between the backplane circuit board 108 and the primary circuit board 110.

In one or more examples, the media drive 102 may be disposed in an internal volume of the drive carrier 104 and coupled to the drive carrier 104, thereby carrying the media drive 102 to the drive carrier 104 and forming a drive carrier assembly. Further, the drive carrier assembly having the drive carrier 104 and the media drive 102 may be positioned in one of a first orientation or a second orientation that is opposite to the first orientation and slidably inserted along the drive bay 136 of the drive cage 106. In some examples, the first orientation and second orientation are rotated 180 degrees from each other. In one example, when the drive carrier 104 is arranged in the first orientation and slidably inserted into the drive bay 136 of the drive cage 106, the keying protrusion 132 of the drive carrier 104 is aligned with the keying flange 134 of the drive cage 106 to prevent the media drive 102 from being coupled to the backplane circuit board 108. In such example, when the drive carrier 104 is arranged in the second orientation that is opposite to the first orientation and slidably inserted into the drive bay 136 of the drive cage 106, the keying protrusion 132 is aligned away from the keying flange 134 to allow the media drive 102 to be coupled to the backplane circuit board 108. The keying protrusion 132 and the keying flange 134, which are configured to regulate the arrangement of the drive carrier 104 in the drive cage 106 in one of the first orientation or the second orientation, are discussed in greater details below in the example of FIGS. 6A-6B.

Additionally, in some examples, when the drive carrier 104 having the 2 T thickness (2 T thickness drive carrier) is inserted into the drive cage 106 along a first drive bay 136A (e.g., odd numbered drive bays), guide members (not shown in FIG. 1) of the drive cage 106 defining the first drive bay 136A and a second drive bay 136B may allow the drive carrier 104 to move along the first and second drive bays 136A, 136B and install the drive carrier 104 to the drive cage 106. However, when the 2 T thickness drive carrier 104 is inserted into the drive cage along the second drive bay 136B (e.g., even numbered drive bays), the guide members defining a third drive bay 136C may restrict the 2 T thickness drive carrier 104 to move along the second and third drive bays 136B, 136C and prevent the drive carrier 104 from fully installing into the drive cage 106. The guide members which are configured to regulate the installation of the drive carrier 104 to the even numbered or odd numbered drive bays of the drive cage 106 are discussed in greater details below in the example of FIGS. 7A-7B.

FIG. 2A depicts a perspective view of a media drive 202. In one example, the media drive 202 is an EDSFF drive. In such example, the media drive 202 has a volume 226 defined by a width of about 76 mm, a thickness of about 7.5 mm, and a length of about 112.75 mm, as indicated by orientation legend 10. In particular, the media drive 202 is an E3.S EDSFF 1 T drive (or 1 T thickness drive). It may be noted that, in various examples of the media drive 202, circuitry and other components of the media drive 202 may not occupy the entirety of the volume 226. The media drive 202 has a first indicator LED 228A (light-emitting diode) on a front face 230A thereof for indicating power and activity of the media drive 202. Further, the media drive 202 has a second indicator LED 228B on the front face 230A for indicating attention or error conditions for the media drive 202. Further, the media drive 202 includes a first connector 264 (e.g., an edge plug) disposed at a rear face 230B of the media drive 202. Each of a first side wall 240 and a second side wall 242 of the media drive 202 has a first screw hole 248 therein for attachment of the media drive 202 to the drive carrier 304 (as shown in FIGS. 3A-3B), as described below in the example of FIGS. 3A-3B.

FIG. 2B depicts a perspective view of a media drive 252. In one example, the media drive 202 is an EDSFF drive. In such example, the media drive 252 has a volume 276 defined by a width of about 76 mm, a thickness of about 16.8 mm, and a length of about 112.75 mm, as indicated by orientation legend 10. In particular, the media drive 252 is an E3.S EDSFF 2 T drive (or 2 T thickness drive). It may be noted that, in various examples of the media drive 252, circuitry and other components of the media drive 252 may not occupy the entirety of the volume 276. The media drive 252 has a first indicator LED 278A (light-emitting diode) on a front face 280A thereof for indicating power and activity of the media drive 252. Further, the media drive 252 has a second indicator LED 278B on the front face 280A for indicating attention or error conditions for the media drive 252. Further, the media drive 252 includes a first connector (not shown in FIG. 2B) disposed at a rear face 230B of the media drive 252. Each of a first side wall 290 and a second side wall 292 of the media drive 252 has a first screw hole 288 therein for attachment of the media drive 252 to the drive carrier 404 (as shown in FIGS. 4A-4B), as described herein.

FIG. 3A depicts a perspective rear view of a drive carrier 304 and the media drive 202 of FIG. 2A. FIG. 3B depicts a perspective front view of the drive carrier 304 and the media drive 202 of FIG. 3A. In the description hereinafter, FIGS. 3A-3B are described concurrently for ease of illustration.

In one or more examples, the drive carrier 304 may be used to receive and carry the media drive 202 and releasably couple the media drive 202 to an electronic device 600 (as shown in FIGS. 6A-6B and 7A-7B). The drive carrier 304 includes a front structure 338, a first side structure 340, and a second side structure 342. The front structure 338 has a first end 344A, a second end 344B, a front face 346A, and a rear face 346B opposite to the front face 346A. In such examples, the first side structure 340 extends perpendicularly from the first end 344A and the second side structure 342 extends perpendicularly from the second end 344B, forming a substantially U-shaped structure with squared corners. Each of the first side structure 340 and the second side structure 342 may have a second screw hole 388 therein for attachment of the drive carrier 304 to the media drive 202, as described herein. Further, the drive carrier 304 includes a plurality of electromagnetic interference (EMI) spring clips 390 provided on the front structure 338 to prevent electromagnetic (EM) leakage by contacting the EMI spring fingers of adjacent drives to provide a continuous wall or mesh of electrically conductive material, which is coupled to the metal chassis, forming something like a Faraday cage, which prevents EM waves from exiting the device through the drive bay openings. While the EMI spring clips 390 may also provide some friction that might help to hold the drive in place. Also, there is a latch provided whose main purpose is to hold the drive in the device. Further, an EMI side spring clip 392 is provided in each of the first side structure 340 and the second side structure 342 to prevent electromagnetic (EM) leakage and secure the drive carrier 304 within the electronic device 600. In one or more examples, a free end of one of the first side structure 340 or the second side structure 342 has a keying protrusion 332. In the illustrated example, a free end 348 of the first side structure 340 has the keying protrusion 332. In particular, the keying protrusion 332 is bent inwards facing the second side structure 342 and extends parallel to the front structure 338. The front structure 338 may further include a hinged handle 394 biased with a spring (not shown) to swivel forward upon depression of a locking button 396. Once the locking button 396 is swiveled open, the hinged handle 394 facilitates removal of the drive carrier 304 from the electronic device 600. In various examples, the front structure 338 also includes a first indicator light bezel 398A and a second indicator bezel 398B for exposing the first indicator LED 228A and the second indicator LED 228B respectively, of the media drive 202. The first indicator LED 228A and the second indicator LED 228B may visually indicate an operation condition of the media drive 202 and attention or error conditions of the media drive 202, respectively, at the front face 346A of the drive carrier 304. In one or more examples, the front structure 338, the first side structure 340, and the second side structure 342 in conjunction defines a drive carrier volume (not labeled) having a first width of about 76 mm, a first thickness of about 7.5 mm, and a first length of about 112.75 mm, as indicated by the orientation legend 10. In one or more examples, the drive carrier volume of the drive carrier 304 may conform to the volume 226 of the media drive 202. In some examples, the drive carrier 304 is an EDSFF drive carrier having a conforming volume to that of the media drive 202, e.g., the EDSFF drive. In particular, the drive carrier 304 has a 1 T thickness to receive and carry the media drive 202 (e.g., E3.S EDSFF 1 T drive) within the drive carrier volume.

In one or more examples, the drive carrier 304 receives the media drive 202 such that the rear face 346B of the front structure 338 abuts the front face 230A of the media drive 202 and the keying protrusion 332 extends beyond the rear face 230B of the media drive 202. Further, the keying protrusion 332 may contact the rear face 230B of the media drive 202. In one or more examples, the first screw holes 248 of the media drive 202 aligns with the second screw holes 388 of the drive carrier 304 when the media drive 202 is disposed in the drive carrier volume. In such examples, a pair of fasteners (not shown) may be fastened through each of the first and second screw holes 248, 388 respectively, to couple the media drive 202 to the drive carrier 304 and form a drive carrier assembly 399.

FIG. 4A depicts a perspective rear view of a drive carrier 404 and the media drive 252 of FIG. 2B. FIG. 4B depicts a perspective front view of the drive carrier 404 and the media drive 252 of FIG. 4A. In the description hereinafter, FIGS. 4A-4B are described concurrently for ease of illustration.

In one or more examples, the drive carrier 404 may be used to receive and carry the media drive 252 and releasably couple the media drive 252 to an electronic device 600 (as shown in FIGS. 6A-6B and 7A-7B). The drive carrier 404 includes a front structure 438, a first side structure 440, and a second side structure 442. The front structure 438 has a first end 444A, a second end 444B, a front face 446A, and a rear face 446B opposite to the front face 446A. In such examples, the first side structure 440 extends perpendicularly from the first end 444A and the second side structure 442 extends perpendicularly from the second end 444B, forming a substantially U-shaped structure with squared corners. Each of the first side structure 440 and the second side structures 442 may have a second screw hole 488 therein for attachment of the drive carrier 404 to the media drive 252, as described herein. In one or more examples, a free end 448 of the first side structure 440 has a keying protrusion 432. In particular, the keying protrusion 332 is bent inwards facing the second side structure 442 and extends parallel to the front structure 438. The front structure 438 may further include a hinged handle 494 biased with a spring (not shown) to swivel forward upon depression of a locking button 496. Once the locking button 496 is swiveled open, the hinged handle 494 facilitates removal of the drive carrier 404 from the electronic device 600. In various examples, the front structure 438 also includes a first indicator light bezel 498A and a second indicator bezel 498B for exposing the first indicator LED 278A and the second indicator LED 278B, respectively, of the media drive 252. In such examples, the first indicator LED 278A and the second indicator LED 278B may visually indicate an operation condition of the media drive 252 and attention or error conditions of the media drive 252, respectively, at the front face 446A of the drive carrier 404. In one or more examples, the front structure 438, the first side structure 440, and the second side structure 442 of the drive carrier 404 in conjunction defines a drive carrier volume (not labeled) having a first width of about 76 mm, a first thickness of about 16.8 mm, and a first length of about 112.75 mm, as indicated by the orientation legend 10. In one or more examples, the drive carrier volume of the drive carrier 404 may conform to the volume 276 of the media drive 252. In some examples, the drive carrier 404 is an EDSFF drive carrier having the volume that conforms to that of the media drive 252 e.g., the EDSFF drive. In particular, each of the first side structure 440 and the second side structure 442 has a first side portion 441 and a second side portion 445 connected to the first side portion 441 by a tapered region 443 of the second side portion 445. In some examples, the first side portion 441 has a first thickness and the second side portion 443 has a second thickness greater than the first thickness. In some examples, the first thickness may be substantially equal to the thickness of the media drive 202, e.g., 1 T thickness drive (as shown in FIG. 2A) and the second thickness may be substantially equal to the thickness of the media drive 252, e.g., 2 T thickness drive (as shown in FIG. 2B).

In one or more examples, the drive carrier 404 receives the media drive 252 such that the rear face 446B of the front structure 438 abuts the front face 280A of the media drive 252 and the keying protrusion 432 extends beyond the rear face 280B of the media drive 252. Further, the keying protrusion 432 may contact the rear face 280B of the media drive 252. Thus, the drive carrier 404 at the front face has a 2 T thickness to carry the media drive 252 (e.g., E3.S EDSFF 2 T drive) within the drive carrier volume. In one or more examples, the first screw holes 288 of the media drive 252 aligns with the second screw holes 488 of the drive carrier 404 when the media drive 252 is disposed in the drive carrier volume. In such examples, a pair of fasteners (not shown) may be fastened through each of the first and second screw holes 288, 488 respectively, to couple the media drive 252 to the drive carrier 404 and form a drive carrier assembly 499.

Figure 5:
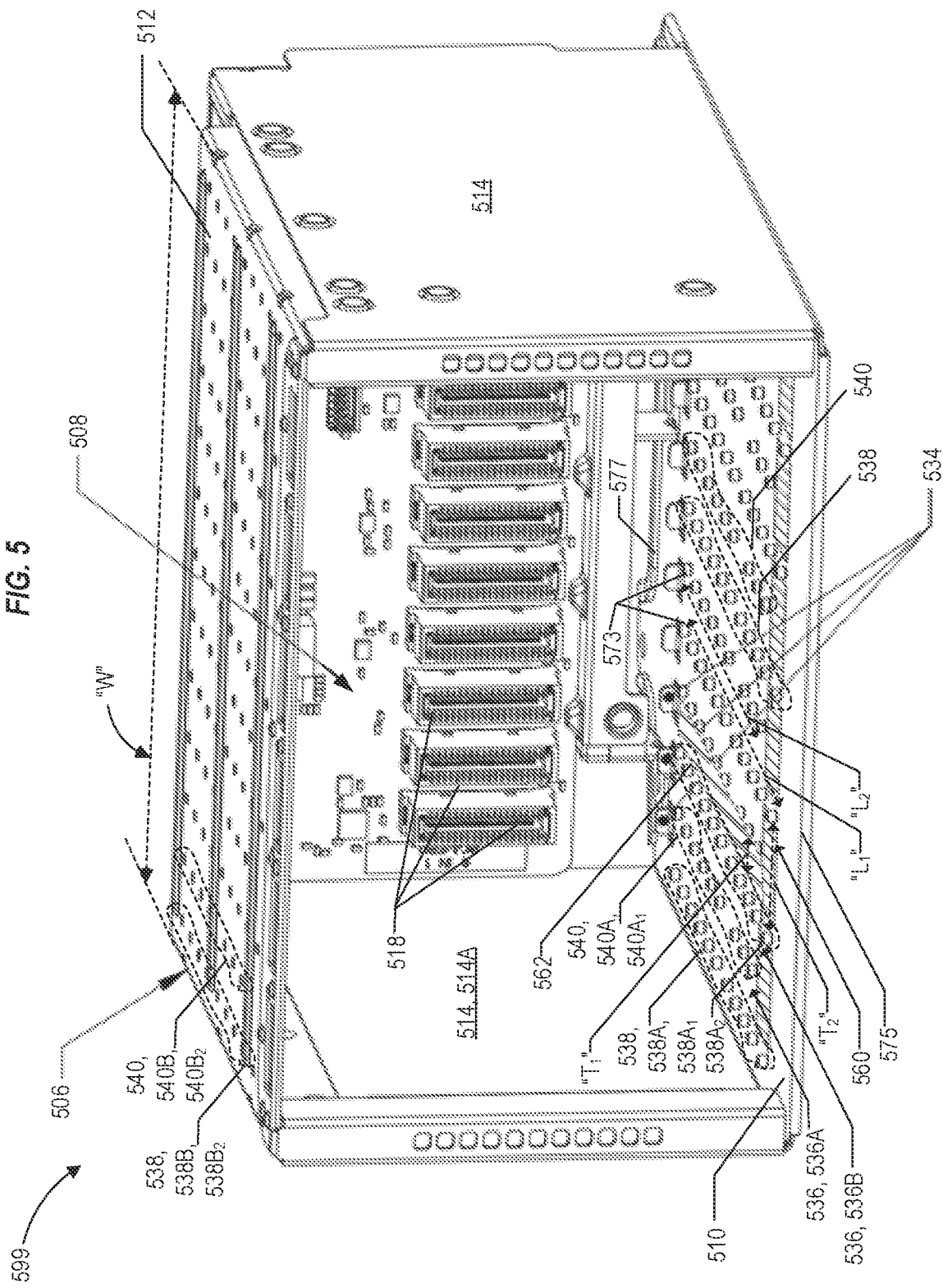
FIG. 5 illustrates a perspective view of a drive cage assembly having a drive cage and a backplane circuit board according to an example of the present disclosure.

FIG. 5 depicts a perspective view of a drive cage 506 and a backplane circuit board 508. In some examples, the drive cage 506 functions as a drive enclosure of the electronic device 600 (as shown in FIGS. 6A-6B and 7A-7B), which may be configured to receive one or more drive carriers 304, 404 and releasably couple the media drives 202, 252 to a primary system board (not shown, e.g., a motherboard) of the electronic device 600 via the backplane circuit board 508. In the example of FIG. 5, the drive cage 506 includes a plurality of keying flanges 534, a plurality of drive bays 536, a plurality of first guide members 538, and a plurality of second guide members 540. Each keying flange of the plurality of keying flanges 534 is inside a corresponding drive bay of the plurality of drive bays 536.

In some examples, the drive cage 506 is formed by a first wall 510, a second wall 512, and a pair of support walls 514. For example, the first wall 510 is coupled to the second wall 512 via the pair of support walls 514. In such examples, each of the plurality of first guide members 538 and each of the plurality of second guide members 540 are formed on both the first and second walls 510, 512. In some examples, each first guide member 538 has a first length "$L_1$" and each second guide member 540 has a second length "$L_2$" smaller than the first length "$L_1$" relative to a rear face 577 of the drive cage 506. Further, the plurality of first guide members 538 and the plurality of second guide members 540 are disposed alternating with each other along a width "W" of the drive cage 506. Accordingly, such alternating arrangement of the first and second guide members 538, 540 having the first and second lengths "$L_1$", "$L_2$" may create a pattern of: i) a 2 T drive carrier keying zone 560 at a front face 575 of the drive cage 506 and ii) a 1 T drive carrier keying zone 562 between the front face 575 and a rear face 577 of the drive cage 506. In particular, each 2 T drive carrier keying zone 560 is created between a first guide member $538A_1$ and an adjacent first guide member $538A_2$, and each 1 T drive carrier keying zone 562 is created between the first and second guide members 538, 540. In such examples, the 2 T drive carrier keying zone 560 may have thickness and shape which is substantially equal and similar to the 2 T thickness of the second side portion 445 of each of the first and second side structures 440, 442 of the drive carrier 404. In particular, the second side portion 445 of each of the first and second side structures of the drive carrier 404 are geometrically identical to the 2 T drive carrier keying zone 560. Similarly, the 1 T drive carrier keying zone 562 may have thickness and shape which is substantially equal and similar to the 1 T thickness of the first side portion 441 of each of first and second side structures 440, 442 of the drive carrier 404 or to the 1 T thickness of each of first and second side structures 340, 342 of the drive carrier 304. In particular, the first side portion 441 of each of the first and second side structures 440, 442 of the drive carrier 404 are geometrically identical to the 1 T drive carrier keying zone 562 or each of the first and second side structures 340, 342 of the drive carrier 304 are geometrically identical to the 1 T drive carrier keying zone 562

Further, in the illustrated example, a first guide member 538A is disposed adjacent to a first support wall 514A of the pair of support walls 514, and a second guide member 540A is disposed next to the first guide member 538A. However in some other examples, the second guide member 540A may be disposed adjacent to the first support wall 514A and the first guide member 538A may be disposed next to the second guide member 540A. Further, the first and second guide members 538, 540 disposed on the first and second walls 510, 512 together define each drive bay among the plurality of drive bays 536 of the drive cage 506. For example, a first guide member $538A_1$ and a second guide member $540A_1$ in the first wall 510 and a first guide member $538B_1$ and a second guide member $540B_2$ in the second wall 512 together define a first drive bay 536A of the plurality of drive bays 536. As discussed herein, each drive bay 536 (or each 1 T drive carrier keying zone 562) has a thickness "$T_1$" which is substantially equal to the 1 T thickness of the media drive 202 or the 1 T thickness of the first side portion 441 of the first and second side structures 440, 442 of the drive carrier 404. Similarly, two adjacent drive bays e.g., 536A, 536B (or 2 T drive carrier keying zone 560) have a thickness "$T_2$" which is substantially equal to the 2 T thickness of the media drive 252 or the 2 T thickness of the second side portion 445 of the first and second side structures 440, 442 of the drive carrier 404. In the illustrated example, each first and second guide members 538, 540 includes a plurality of discrete guide elements, e.g., embosses or flanges. In such examples, each of the plurality of discrete guide elements is bent inwards from the first and second walls 510, 512. In some other examples, each first and second guide members 538, 540 may be a single guide element, which may be coupled or affixed to the first and second walls 510, 512.

In the illustrated example, each keying flange 534 is bent inwards from the first wall 510 of the drive cage 506 facing the second wall 512 of the drive cage 506. In some other examples, the keying flange 534 may be affixed or coupled to the first wall 510 of the drive cage 506. The keying flange 534 is inside each drive bay 536. In particular, the keying flange 534 is positioned between each first and second guide members 538, 540 and disposed behind the first and second guide members 538, 540. For example, the keying flange 534 is disposed between the rear end 573 of each first and second guide members 538, 540 and the backplane circuit board 508.

The backplane circuit board 508 is disposed and coupled to the rear face 577 of the drive cage 506 to form a drive cage assembly 599. In some examples, the backplane circuit board 508 includes a plurality of second connectors 518 (e.g., an edge socket) disposed facing the front face 575 of the drive cage 506. The backplane circuit board 508 may include a backplane connector (e.g., a golden finger plug, not shown) which may be electrically connected to each of the plurality of second connectors 518 via traces (not shown) formed in a substrate (not labeled) of the backplane circuit board 508. Further, when the drive cage assembly 599 is coupled to a chassis (not shown) of the electronic device 600, the backplane connector of the backplane circuit board 508 may be inserted into a primary connector of the primary circuit board to allow an electrical connection between the backplane circuit board 508 and the primary circuit board.

Figure 6A:
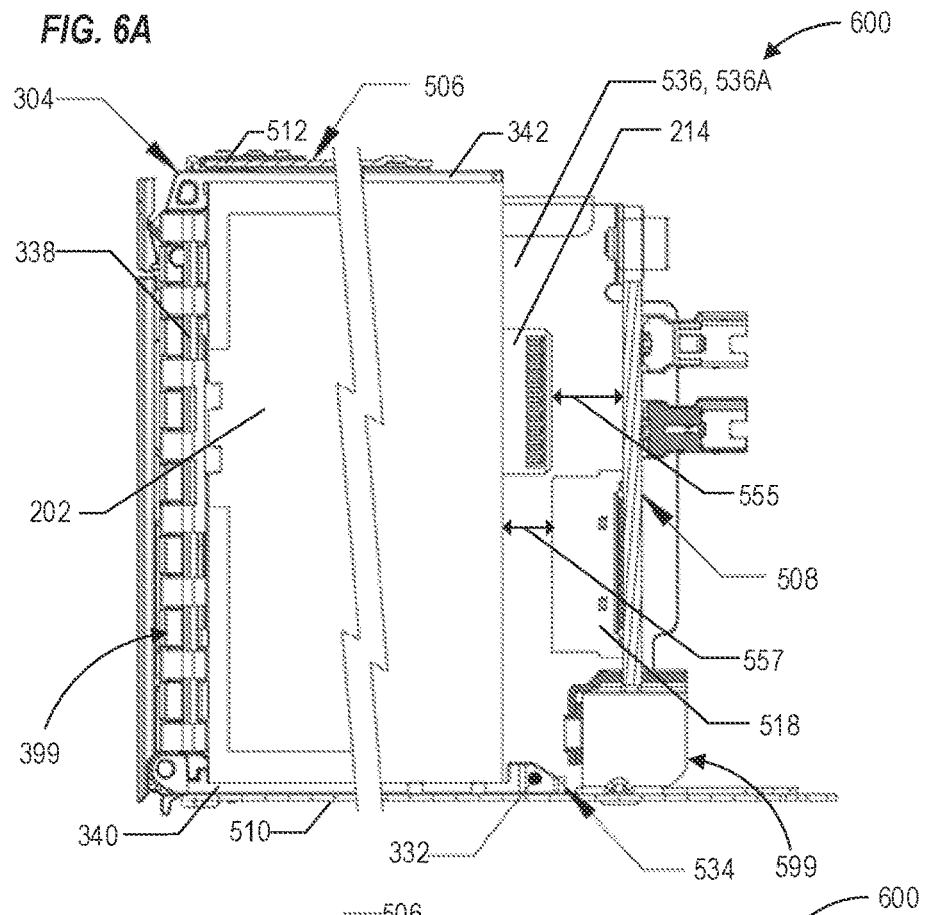
FIG. 6A illustrates a cross-sectional side view of a portion of an electronic device having the drive carrier assembly of FIGS. 3A-3B arranged in the drive cage assembly of FIG. 5 in a first orientation according to an example of the present disclosure.
Figure 6B:
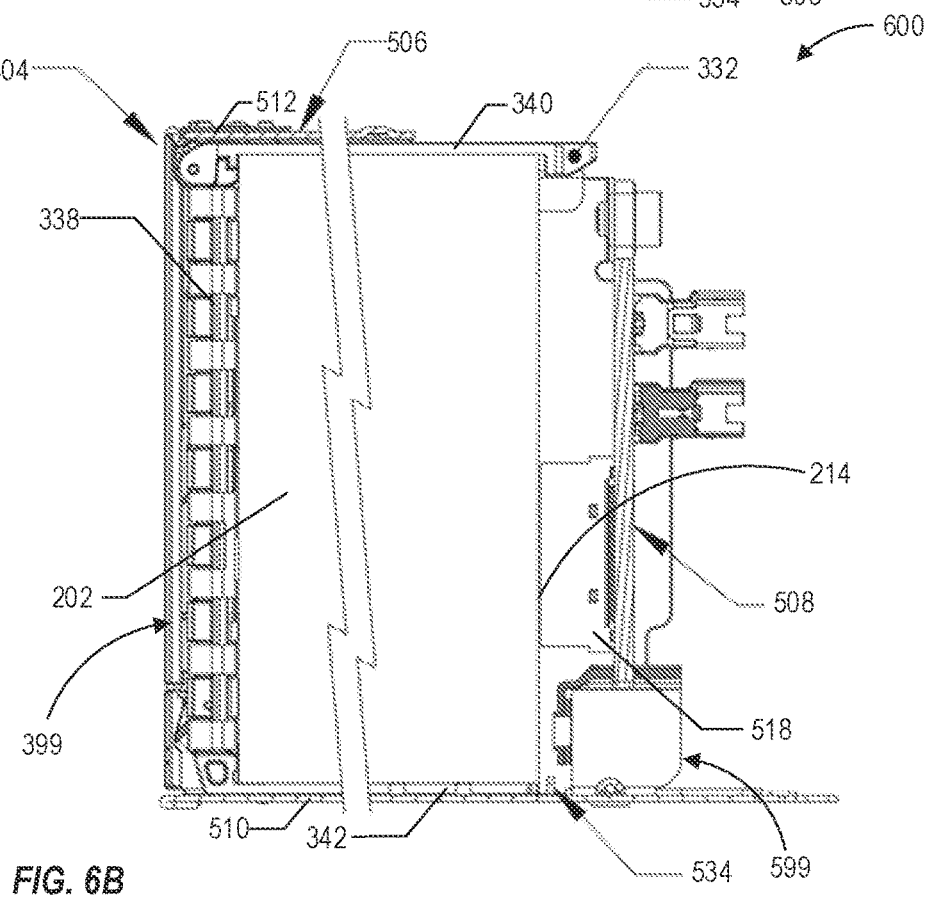
FIG. 6B illustrates a cross-sectional side view of a portion of an electronic device having the drive carrier assembly of FIGS. 3A-3B arranged in the drive cage assembly of FIG. 5 in a second orientation according to an example of the present disclosure.

FIG. 6A depicts a cross-sectional side view of a portion of an electronic device 600 having a drive carrier assembly 399 of FIGS. 3A-3B arranged in a drive cage assembly 599 of FIG. 5 in a first orientation. FIG. 6B depicts a cross-sectional side view of the portion of the electronic device 600 having the drive carrier assembly 399 of FIGS. 3A-3B arranged in the drive cage assembly 599 of FIG. 5 in a second orientation. In the description hereinafter, FIGS. 6A-6B are described concurrently for ease of illustration.

As discussed herein, the drive carrier assembly 399 includes a media drive 202 and a drive carrier 304, where a front structure 338, a first side structure 340, and a second side structure 342 of the drive carrier 304, in conjunction receives and carries the media drive 202 therein. The first side structure 340 include a keying protrusion 332 extending beyond a rear face of the media drive 202. The media drive 202 includes a first connector 214 disposed at the rear face of the media drive 202. The drive cage assembly 599 includes a drive cage 506 and a backplane circuit board 508 coupled to a rear face of the drive cage 506. The drive cage 506 includes a keying flange 534 formed on a first wall 510 of the drive cage 506. The drive cage 506 further includes a first guide member and a second guide member (not shown), which together defines a drive bay 536 of the drive cage 506. In some examples, the drive bay 536 may be a first drive bay 536A of the drive cage 506. The backplane circuit board 508 includes a second connector 518 disposed facing a front face of the drive cage 506.

Referring to FIG. 6A, when the drive carrier 304 is positioned in the first orientation and inserted into the drive cage 506 to arrange the drive carrier 304 in the drive bay 536 in the first orientation, the first side structure 340 contacts the first wall 510 and the second side structure 342 contacts a second wall 512 of the drive cage 506. Further, in the first orientation of the drive carrier 304, the keying protrusion 332 is aligned with the keying flange 534 to prevent the media drive 202 to be coupled to the backplane circuit board 508. In particular, the keying protrusion 332 contacts the keying flange 534, and prevents the first connector 214 from coupling with the second connector 518. Further, the first connector 214 is stopped at a first offset distance 555 from the backplane circuit board 508 to prevent damage to either the first connector 214 or the backplane circuit board 508. Similarly, the second connector 518 is positioned at a second offset distance 557 from the media drive 202 to prevent damage to either the second connector 518 or the media drive 202.

Referring to FIG. 6B, when the drive carrier 304 is positioned in the second orientation that is opposite to the first orientation and inserted into the drive cage 506 to arrange the drive carrier 304 in the drive bay 536 in the second orientation, the first side structure 340 contacts the second wall 512 and the second side structure 342 contacts the first wall 510. Further, in the second orientation of the drive carrier 304, the keying protrusion 332 is aligned away from the keying flange 534 to allow the media drive 202 to be coupled to the backplane circuit board 508. In particular, the keying protrusion 332 moves away from the keying flange 534, and allows the first connector 214 to couple with the second connector 518.

Since the keying protrusion 332 extends beyond the rear face of the media drive 202, the keying protrusion 332 may not occupy space within the first and second side structures 340, 342. Further, since the keying protrusion 332 is designed at a free end of one of the first or second side structures 340, 342 of the drive carrier 304, the keying protrusion 332 may not interfere with an increased hoop stress of the first and second side structures 340, 342 around the second screw holes 388.

FIG. 7A depicts a cross-sectional top view of another portion of an electronic device 600 having a drive carrier assembly 499 of FIGS. 4A-4B arranged in a drive cage assembly 599 of FIG. 5 in a second orientation along a first drive bay 536A. FIG. 7B depicts a cross-sectional top view of the other portion of the electronic device 600 having the drive carrier assembly 499 of FIGS. 4A-4B arranged in the drive cage assembly 599 of FIG. 5 in the second orientation along a second drive bay 536B. In the description hereinafter, FIGS. 7A-7B are described concurrently for ease of illustration.

As discussed herein, the drive carrier assembly 499 includes a media drive 252 (as shown in FIG. 2B) and a drive carrier 404, where a front structure (not shown), a first side structure 440 (as shown in FIGS. 4A-4B), and a second side structure 442 of the drive carrier 304, in conjunction receives and carries the media drive 252 therein. The second side structure 442 includes a first side portion 441 and a second side portion 445 connected to the first side portion 441 by a tapered region 443. The drive cage assembly 599 includes a drive cage 506 and a backplane circuit board 508 (a shown in FIG. 5) coupled to a rear face of the drive cage 506. The drive cage 506 includes a plurality of first guide members 538 and a plurality of second guide members 540 formed on a first wall 510 of the drive cage 506. A first guide member $538A_1$ and a second guide member $540A_1$ together define a first drive bay 536A of the drive cage 506. Similarly, the second guide member $540A_1$ and an adjacent first guide member $538A_2$ together define a second drive bay 536B of the drive cage 506. Further, the adjacent first guide member $538A_2$ and an adjacent second guide member $540A_3$ together define a third drive bay 536C of the drive cage 506.

Each of the first, second, and third drive bays 536A, 536B, 536C has a 1 T thickness. In particular, the space between the first and second guide members 538, 540 may be referred to as a 1 T drive carrier keying zone 562. Further, the shape formed between the first and second guide members 538, 540 may conform to the first side portion 441 of the second side structure 442. Similarly, the space between each first guide member $538A_1$ and the adjacent first guide member $538A_2$ may be referred to as a 2 T drive carrier keying zone 560. Further, the shape formed by the space between the first guide member $538A_1$ and the adjacent first guide member $538A_2$ along the width "W" of the drive cage 506 may conform to shape of the second side portion 445 of the second side structure 442. In other words, the space between the guide members $538A_1$ and $538A_2$ may have essentially the same shape as the second side portion 445 of the second side structure 442, except the open space may be slightly larger than the second side portion 445 to allow for smooth insertion (i.e., the two shapes are similar, in the geometrical sense of the term).

Referring to FIG. 7A, the drive carrier 404 is positioned in the second orientation (as shown in FIG. 6B) and inserted into the drive cage 506 to arrange the drive carrier 404 in the first drive bay 536A (or even numbered drive bay). In such examples, the first guide member 538A$_1$ and the second guide member 540A$_1$ of the first drive bay 536A direct the first side portion 441 of each of the first and second side structures 440, 442 to move along (e.g., slidably insert into) the first drive bay 536A (or the 1 T drive carrier keying zone 562). Further, the first guide member 538A of the first drive bay 536A$_1$ and the adjacent first guide member 538A$_2$ of the second drive bay 536B direct the second side portion 445 of each of the first and second side structures 440, 442 to further move along the first and second drive bays 536A, 536B (or the 2 T drive carrier keying zone 560), thereby allowing the installation of the drive carrier 404 to the drive cage 506.

Referring to FIG. 7B, the drive carrier 404 is positioned in the second orientation (as shown in FIG. 6B) and inserted into the drive cage 506 to arrange the drive carrier 404 in the second drive bay 536B (or odd numbered drive bay). In such examples, the second guide member 540A$_1$ and an adjacent first guide member 538A$_2$ of the second drive bay 538B direct the first side portion 441 of each of the first and second side structures 440, 442 to move along (e.g., slidably insert into) the second drive bay 536B (or the 1 T drive carrier keying zone 562). Further, the adjacent first guide member 538A$_2$ of the second drive bay 536B and the third drive bay 536C engage with the tapered region 443 of the second side portion 445 of each of the first and second side structures 440, 442 to restrict the drive carrier 404 to move further along the second and third drive bays 536B, 536C, thereby preventing installation of the drive carrier 404 to the drive cage 506.

Since the drive cage 506 is designed with the first guide member 538 having full length (e.g., first length) and the second guide member 540 having reduced length (e.g., second length), and such first and second guide members 538, 540 are disposed alternatively along the width of the drive cage 506, the storage density of the drive cage 506 may be maximized by allowing the 2 T drive carrier 404 to be installed only in the odd numbered drive bay 536A, 536C, and not in the even numbered drive bay 536B, for example.

Figure 8:
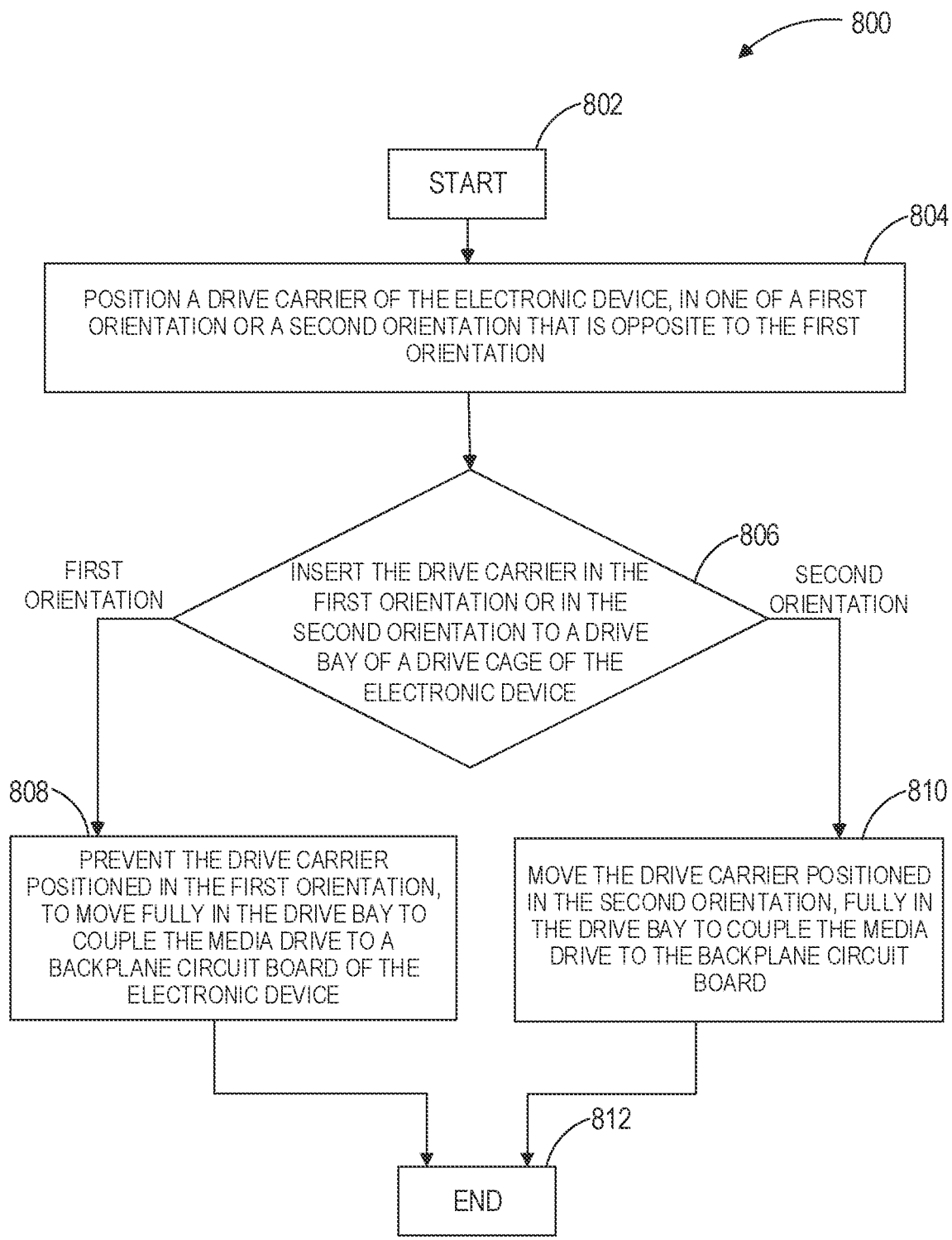
FIG. 8 is a flowchart depicting a method of assembling a drive carrier assembly in a drive cage assembly in one of a first orientation or a second orientation according to one example of the present disclosure.

FIG. 8 depicts a flowchart depicting a method 800 of assembling a drive carrier in a drive cage of an electronic device. It may be noted herein that the method 800 is described in conjunction with FIGS. 2A-2B, 3A-3B, 5, and 6A-6B, for example. The method 800 starts at block 802 and continues to block 804.

At block 804, the method 800 includes positioning a drive carrier of the electronic device, in one of a first orientation or a second orientation that is opposite to the first orientation. In one or more examples, a media drive, such as an EDSFF drive is coupled to the drive carrier. In such examples, the drive carrier is an EDSFF drive carrier. The media drive may be a 1 T thickness drive or a 2 T thickness drive. Similarly, the drive carrier may have a 1 T thickness to carry such 1 T thickness drive or may have a 2 T thickness to carry such 2 T thickness drive. The method 800 continues to block 806.

At block 806, the method 800 includes inserting the drive carrier in the first orientation or in the second orientation in a drive bay of a drive cage of the electronic device. In some examples, the drive cage is an EDSFF drive cage. In one or more examples, the drive carrier is slidably inserted into any one of the plurality of drive bays to arrange the drive carrier in the drive cage. The method 800 may continue to either block 808 or block 810 depending on the orientation of the drive carrier when inserted to the drive cage.

At block 808, the method 800 includes, preventing the drive carrier positioned in the first orientation, to move fully in the drive bay to couple the media drive to a backplane circuit board of the electronic device. In particular, at block 808, when the drive carrier is positioned in the first orientation, a keying protrusion of the drive carrier is aligned with a keying flange of the drive cage. Thus, when the drive carrier is inserted to the drive bay, the keying protrusion contacts the keying flange and prevents a first connector of the media drive to be coupled to a second connector of a backplane circuit board of the electronic device. In some examples, the drive cage includes a plurality of first guide members and a plurality of second guide members disposed alternating to each other along a width of the drive cage. In such examples, the keying flange is positioned between the first and second guide members and disposed between the first and second guide members and the backplane circuit board. The method 800 ends at block 812.

At block 810, the method 800 includes, moving the drive carrier positioned in the second orientation, fully in the drive bay to couple the media drive to the backplane circuit board. In particular, at block 810, when the drive carrier is positioned in the second orientation, the keying protrusion of the drive carrier is aligned away from the keying flange of the drive cage. Thus, when the drive carrier is inserted into the drive bay, the keying protrusion does not contact the keying flange, and allows the first connector of the media drive to be coupled to second connector of the backplane circuit board. The method 800 ends at block 812.

Figure 9:
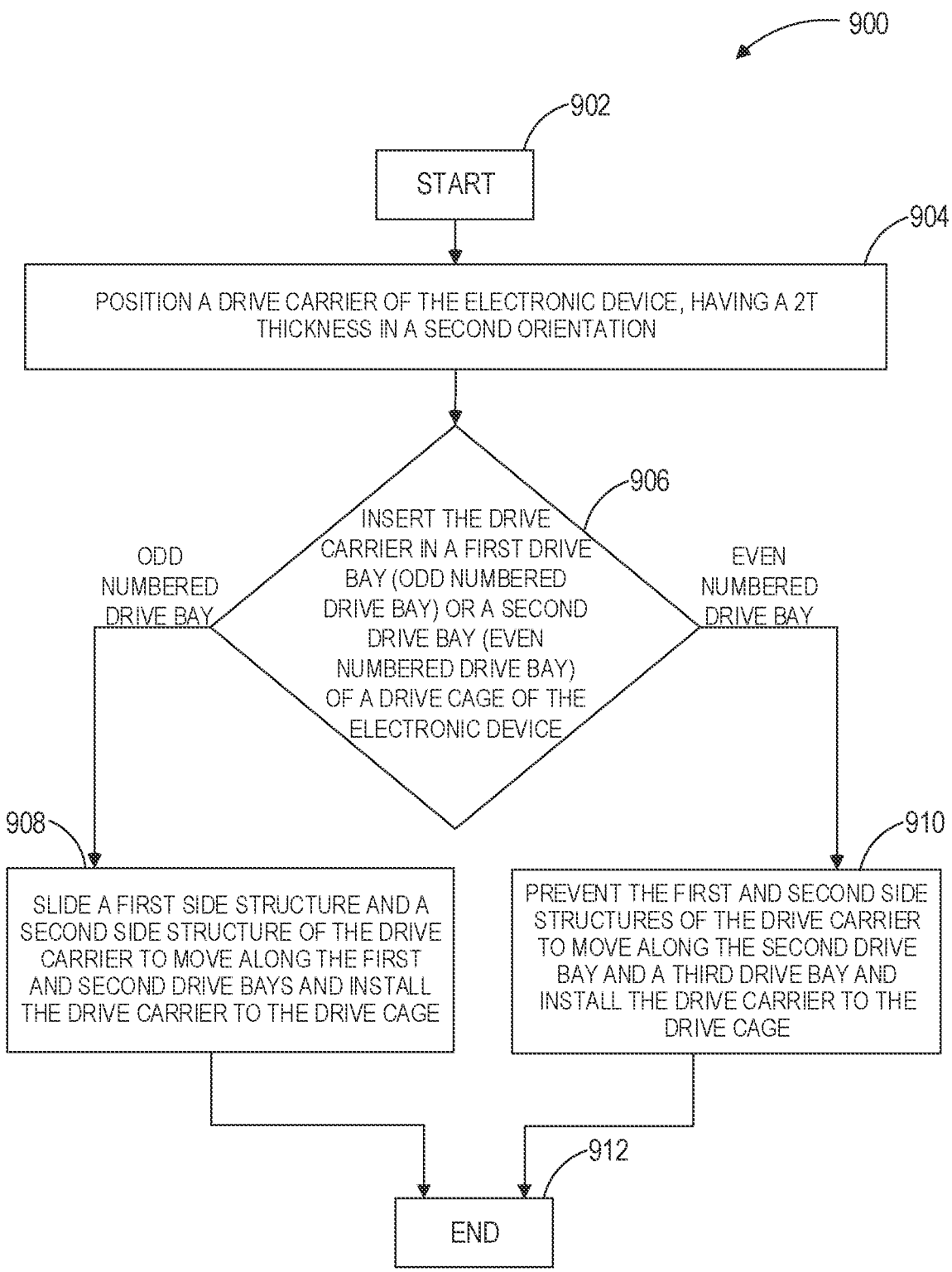
FIG. 9 is a flowchart depicting a method of assembling a drive carrier assembly along one of first drive bay or a second drive bay of a drive cage assembly according to one example of the present disclosure.

FIG. 9 depicts a flowchart depicting a method 900 of assembling a drive carrier in a drive cage of an electronic device. It may be noted herein that the method 900 is described in conjunction with FIGS. 2A-2B, 4A-4B, 5, and 7A-7B, for example. The method 900 starts at block 902 and continues to block 904.

At block 904, the method 900 includes positioning a drive carrier of the electronic device, having a 2 T thickness in a second orientation. In one or more examples, a media drive, such as an EDSFF drive, is received and carried by the drive carrier. In such examples, the drive carrier is also an EDSFF drive carrier. The media drive may be a 2 T thickness drive. Accordingly, the drive carrier may have the 2 T thickness to carry the 2 T thickness drive. The method 900 continues to block 906.

At block 906, the method 900 includes inserting the drive carrier in a first drive bay (odd numbered drive bay) or a second drive bay (even numbered drive bay) of a drive cage of the electronic device. In some examples, the drive cage is an EDSFF drive cage. In one or more examples, the drive carrier is slidably inserted into the first drive bay so as to arrange the drive carrier in the drive cage. More specifically, the drive carrier comprises side structures and the inserting of the drive carrier into the first drive bay or second drive bay comprises inserting the rear ends of these side structures into the first drive bay or second drive bay. In other words, while the drive carrier may occupy the space of two drive bays (because it is a 2 T drive carrier), for purposes of block 906 the drive carrier may be regarded as being inserted into the drive bay that receives the rear ends of the side structures. The method 900 may continue to either block 908 or block 910 depending on whether the drive carrier is inserted to the first drive bay or the second drive bay.

At block 908, the method 900 includes sliding the side structures of the drive carrier along the first drive bay of the drive cage to install the drive carrier to the drive cage. In particular, a first guide member and a second guide member of the drive cage defining the first drive bay, and the second guide member and an adjacent first guide member defining the second drive bay may allow the first side structure and a second side structure of the drive carrier to move along the first and second drive bays and install the drive carrier to the drive cage. The method 900 ends at block 912.

At block 910, the method 900 includes preventing the first and second side structures of the drive carrier from moving along the first drive bay and a third drive bay of the drive cage and installing the drive carrier to the drive cage. In particular, the adjacent first guide member of the second drive bay and the third drive bay of the drive cage may engage with the first and second side structures of the drive carrier to prevent the drive carrier to move along the second and third drive bays and install the drive carrier to the drive cage. In one or more examples, each of the first side structure and the second side structure includes a first side portion having a first thickness and a second side portion having a second thickness greater than the first thickness to define the 2 T thickness of the drive carrier. The first guide member has a first length and the second guide member has a second length smaller than the first length, and such first and second guide members are disposed alternatively along a width of the drive cage. The method 900 ends at block 912.

In the foregoing description, numerous details are set forth to provide an understanding of the subject matter disclosed herein. However, implementation may be practiced without some or all of these details. Other implementations may include modifications, combinations, and variations from the details discussed above. It is intended that the following claims cover such modifications and variations.

What is claimed is:

1. An electronic device comprising:
   a drive carrier, comprising:
      a front structure having a first end, a second end, a front face, and a rear face opposite to the front face;
      a first side structure extending perpendicularly from the first end, the first side structure having a keying protrusion; and
      a second side structure extending perpendicularly from the second end, the front structure, the first side structure, and the second side structure in conjunction configured to receive a media drive such that the rear face of the front structure abuts a front face of the media drive and the keying protrusion extends beyond a rear face of the media drive;
   a drive cage comprising a drive bay, a keying flange inside the drive bay, and a plurality of first guide members and a plurality of second guide members disposed alternating to each other along a width of the drive cage, wherein each of the plurality of first guide members has a first length and each of the plurality of second guide members has a second length smaller than the first length, and wherein each first and second guide members together define the drive bay among a plurality of drive bays of the drive cage; and
   a backplane circuit board,
   wherein, when the drive carrier is arranged in the drive bay in a first orientation, the keying protrusion is aligned with the keying flange to prevent the media drive to be coupled to the backplane circuit board, and
   wherein, when the drive carrier is arranged in the drive bay in a second orientation that is opposite to the first orientation, the keying protrusion is aligned away from the keying flange to allow the media drive to be coupled to the backplane circuit board.

2. The electronic device of claim 1, wherein each of the first and second side structures has a first side portion and a second side portion connected to the first side portion by a tapered region of the second side portion, and wherein the first side portion has a first thickness and the second side portion has a second thickness greater than the first thickness.

3. The electronic device of claim 2, wherein, when the drive carrier is inserted along a first drive bay of the drive cage:
   i) a first guide member and a second guide member of the first drive bay direct the first side portion of each of the first and second side structures to move along the first drive bay; and
   ii) the first guide member of the first drive bay and an adjacent first guide member of a second drive bay direct the second side portion of each of the first and second side structures to further move along the first and second drive bays and allow installation of the drive carrier to the drive cage.

4. The electronic device of claim 2, wherein, when the drive carrier is inserted along a second drive bay of the drive cage:
   i) a second guide member and an adjacent first guide member of the second drive bay direct the first side portion of each of the first and second side structures to move along the second drive bay; and
   ii) the adjacent first guide member of the second drive bay and a third drive bay engage with the tapered region of the second side portion of each of the first and second side structures to restrict the drive carrier from moving further along the second and third drive bays and prevent installation of the drive carrier to the drive cage.

5. The electronic device of claim 1, wherein each first and second guide members comprises a plurality of discrete guide elements.

6. The electronic device of claim 1, wherein the drive cage further comprises a first wall and a second wall connected to each other by a pair of support walls of the drive cage, wherein the plurality of first guide members and the plurality of second guide members are formed in each of the first and second walls, and wherein the keying flange is formed in one of the first wall or the second wall.

7. The electronic device of claim 6, wherein the keying flange is positioned between each first and second guide members and disposed behind the first and second guide members.

8. The electronic device of claim 1, wherein the drive carrier is an enterprise and data center standard form factor (EDSFF) drive carrier, and wherein the drive cage is an EDSFF drive cage.

9. A drive cage of an electronic device, comprising:
   a drive bay;
   a plurality of first guide members and a plurality of second guide members disposed alternating to each other along a width of the drive cage, wherein each first guide member of the plurality of first guide members has a first length and each second guide member of the plurality of second guide members has a second length smaller than the first length; and a keying flange inside the drive bay, wherein the keying flange is positioned between each first and second guide members and disposed behind the first and second guide members, wherein, when a drive carrier of the electronic device is arranged in the drive bay in a first orientation, the keying flange is aligned with a keying protrusion of the drive carrier to prevent a media drive carried by the drive carrier, to be coupled to a backplane circuit board of the electronic device, and wherein, when the drive carrier is arranged in the drive bay in a second orientation that is opposite to the first orientation, the keying flange is aligned away from the keying protrusion to allow the media drive to be coupled to the backplane circuit board.

10. The drive cage of claim 9, wherein each first and second guide members together define the drive bay among a plurality of drive bays of the drive cage.

11. The drive cage of claim 10, wherein, when the drive carrier is inserted along a first drive bay of the drive cage:
   i) the first and second guide members of the first drive bay direct a first side portion of each of a first side structure and a second side structure of the drive carrier to move along the first drive bay; and
   ii) the first guide member of the first drive bay and an adjacent first guide member of a second drive bay direct a second side portion of each of the first and second side structures to further move along the first and second drive bays and allow installation of the drive carrier to the drive cage,
   wherein the first side portion has a first thickness and the second side portion has a second thickness greater than the first thickness.

12. The drive cage of claim 10, wherein, when the drive carrier is inserted along a second drive bay of the drive cage:
   i) the second guide member and an adjacent first guide member of the second drive bay direct a first side portion of each of a first side structure and a second side structure of the drive carrier to move along the second drive bay; and
   ii) the adjacent first guide member of the second drive bay and a third drive bay engage with a tapered region of a second side portion of each of the first and second side structures to restrict the drive carrier from moving further along the second and third drive bays and to prevent installation of the drive carrier to the drive cage,
   wherein the first side portion has a first thickness and the second side portion has a second thickness greater than the first thickness.

13. The drive cage of claim 10, wherein each first and second guide members comprises a plurality of discrete guide elements.

14. The drive cage of claim 9, further comprising a first wall and a second wall connected to each other by a pair of support walls of the drive cage, wherein the plurality of first guide members and the plurality of second guide members are formed in each of the first and second walls, and wherein the keying flange is formed in one of the first wall or the second wall.

15. The drive cage of claim 9 is an enterprise and data center standard form factor (EDSFF) drive cage.

16. A method for assembling an electronic device, comprising:
   positioning a drive carrier of the electronic device, in one of a first orientation or a second orientation that is opposite to the first orientation; and
   inserting the drive carrier in a drive bay of a plurality of drive bays of a drive cage of the electronic device to arrange the drive carrier in the drive cage, such that:
      when the drive carrier is positioned in the first orientation, a keying protrusion of the drive carrier is aligned with a keying flange of the drive cage to prevent a media drive to be coupled to a backplane circuit board of the electronic device;
      when the drive carrier is positioned in the second orientation, the keying protrusion is aligned away from the keying flange to allow the media drive to be coupled to the backplane circuit board;
      when the drive carrier is inserted along a first drive bay of the plurality of drive bays, a first guide member and a second guide member of the drive cage defining the first drive bay and the second guide member and an adjacent first guide member defining a second drive bay among the plurality of drive bays allow a first side structure and a second side structure of the drive carrier to move along the first and second drive bays and install the drive carrier to the drive cage; and
      when the drive carrier is inserted along the second drive bay, the adjacent first guide member of the second drive bay and a third drive bay of the plurality of drive bays engages with the first and second side structures of the drive carrier to restrict the drive carrier from moving further along the second and third drive bays and prevent installation of the drive carrier to the drive cage.

17. The method of claim 16, wherein inserting the drive carrier in the drive bay comprises inserting the drive carrier having a 2 T thickness along one of the first drive bay or the second drive bay.

18. The method of claim 17, wherein each of the first side structure and the second side structure comprises a first side portion having a first thickness and a second side portion having a second thickness greater than the first thickness, and wherein the first guide member has a first length and the second guide member has a second length smaller than the first length.

19. The method of claim 17, wherein the keying flange is positioned between the first and second guide members and disposed behind the first and second guide members.

* * * * *